United States Patent [19]

Smith, Jr. et al.

[11] 4,152,590
[45] May 1, 1979

[54] SIMULTANEOUS THERMAL NEUTRON DECAY TIME AND POROSITY LOGGING SYSTEM

[75] Inventors: Harry D. Smith, Jr., Houston; Michael P. Smith, Bellaire; Ward E. Schultz, Houston, all of Tex.

[73] Assignee: Texaco Inc., White Plains, N.J.

[21] Appl. No.: 798,717

[22] Filed: May 19, 1977

[51] Int. Cl.$^2$ .............................................. G01V 5/00
[52] U.S. Cl. .................................... 250/264; 250/266; 250/269; 250/270
[58] Field of Search ............... 250/264, 265, 266, 269, 250/270

[56] References Cited

U.S. PATENT DOCUMENTS

| | | | |
|---|---|---|---|
| 3,491,238 | 1/1970 | Allen | 250/269 |
| 3,691,378 | 9/1972 | Hopkinson et al. | 250/264 |
| 3,869,608 | 3/1975 | Scherbatskoy | 250/262 |

*Primary Examiner*—Davis L. Willis
*Assistant Examiner*—Janice A. Howell
*Attorney, Agent, or Firm*—Carl G. Ries; Thomas H. Whaley; William J. Beard

[57] ABSTRACT

A simultaneous pulsed neutron porosity and thermal neutron capture cross section logging system is provided in the present invention. A logging tool provided with a 14 MeV pulsed neutron source, an epithermal neutron detector, and a combination gamma ray and fast neutron detector is moved through a borehole. Repetitive bursts of neutrons irradiate the earth formations and, during the bursts, the fast neutron and epithermal neutron populations are sampled. During the interval between bursts the thermal neutron capture gamma ray population is sampled in two or more time intervals. The fast and epithermal neutron population measurements are combined to provide a measurement of formation porosity $\phi$. The capture gamma ray measurements are combined to provide a simultaneous determination of the thermal neutron capture cross section $\Sigma$.

10 Claims, 5 Drawing Figures

SIMULTANEOUS THERMAL NEUTRON DECAY TIME AND POROSITY LOGGING SYSTEM

BACKGROUND OF THE INVENTION

This invention relates to radiological well logging methods and apparatus for investigating the characteristics of subsurface earth formations traversed by a borehole, and more particularly, to methods and apparatus for simultaneously measuring the porosity and thermal neutron capture cross section of earth formations in the vicinity of a well borehole by means of pulsed neutron well logging techniques.

In the search for hydrocarbons beneath the earth's crust one of the parameters which must be known about an earth formation before evaluating its commercial potential is the fractional volume of fluid filled pore space, or porosity, present around the rock grains comprising the earth formation. Several techniques have been developed in the prior art to measure earth formation porosity in a borehole environment. One such technique employs a gamma ray source and a single, or multiple, detectors to measure the electron density of the earth formations by gamma ray scattering. This leads to an inferential measurement of the porosity of the formations. Another technique employs an acoustic transmitter and one or more acoustic receivers. The velocity of sound transmission through the formation from the acoustic transmitter to the receivers is then measured and this quantity can be related to the porosity since sound travels faster in less porous rocks than in fluid filled pore spaces in the earth formations.

A third commercial technique which has been employed in the prior art to measure the porosity of earth formations employ a neutron source and either a neutron or gamma ray detector sensitive to low energy, or thermalized, neutron density. Hydrogen is the principal agent responsible for slowing down neutrons emitted into an earth formation. Therefore, in a formation containing a larger amount of hydrogen than is present in low porosity formations, the neutron distribution is more rapidly slowed down and is contained in the area of the formation near the source. Hence, the counting rates in remote thermal neutron sensitive detectors located several inches or more from the source will be suppressed. In lower porosity formations which contain little hydrogen, the source neutrons are able to penetrate farther. Hence, the counting rates in the detector or detectors are increased. This behavior may be directly quantified into a measurement of the porosity via well established procedures.

All of these commercially employed porosity measurement methods have generally not proven to be as accurate as desirable due to diameter irregularities of the borehole wall, variation of the properties of different borehole fluids, the irregular cement annulus surrounding the casing in a cased well borehole, and the properties of different types of steel casings and formation lithologies which surround the borehole. For example, the thermal neutron distribution surrounding a source and detector pair sonde as proposed in the prior art can be affected by the chlorine content of the borehole fluid. Similarly, lithological properties of the earth formations in the vicinity of the borehole, such as the boron content of these formations, can affect the measurement of thermal neutron populations. The present invention however, rather than relying on a measurement of the thermal neutron population for porosity comprises a neutron measurement of the formation porosity which utilizes a measurement of the epithermal neutron population at one detector and the fast neutron population at a second detector.

Perhaps the most important parameter necessary for commercial interpretation of a prospective formation is the water saturation Sw of the zone. In the prior art the most prevalent technique for interpreting the water saturation of a zone in a cased well borehole has been by means of the thermal neutron capture cross section $\Sigma$, of the zone. In zones filled with oil and salt water, thermal neutron decay time, thermal neutron lifetime, or thermal neutron die away logs have been successfully used to measure the macroscopic thermal neutron capture cross section of the formations. The water saturation Sw is related to the porosity $\phi$ and the thermal neutron capture cross section $\Sigma$ by the standard relationship $$S_w = \frac{\Sigma - \Sigma_{MA} + \phi(\Sigma_{MA} - \Sigma_{Hc}) + V_{SH}(\Sigma_{MA} - \Sigma_{SH})}{\phi(\Sigma_w - \Sigma_{HC})}$$

where
$\Sigma_{MA}$ = thermal neutron capture cross section of the rock matrix.
$\Sigma_{HC}$ = thermal neutron capture cross section of oil (hydrocarbon)
$\Sigma_{SH}$ = thermal neutron capture cross section of shale
$V_{SH}$ = volume shale fraction of the formation
$\Sigma$ = total measure capture cross section
$\phi$ = total measured porosity.

In the prior art two separate logging passes have generally been necessary to accurately measure $\phi$ and $\Sigma$. This is due to the fact that in the prior art, porosity logging devices using 14 MEV neutron sources (which are presently required in all $\Sigma$ logging devices) have had to rely on inaccurate measurements utilizing thermal neutron capture gamma rays to determine the porosity. As previously mentioned, in the present invention fast and epithermal neutron energy measurements are used to determine the porosity $\phi$, while thermal neutron capture gamma rays are measured only to determine the capture cross section $\Sigma$. This is done in one pass of the logging instrument, thus saving costly rig time and providing a much speedier and more accurate measurement than heretofore has been possible.

Thus, it is an object of the present invention to provide an improved method and apparatus for simultaneously measuring the porosity and thermal neutron capture cross section of earth formations in situ in a well borehole using pulsed neutron source techniques.

BRIEF DESCRIPTION OF THE INVENTION

In accordance with the present invention, a pulse operated high energy neutron source irradiates the earth formations surrounding a well borehole with repetitive bursts of fast neutrons. A pair of detectors, one sensitive to neutrons in the epithermal energy range, and another sensitive to fast neutrons and thermal neutron capture gamma rays measure the fast and epithermal neutron populations at their effective distances from the source. The fast neutron measurements can be separated from thermal neutron interactions by time gating techniques and by pulse shape discrimination. The measurements of the fast and epithermal neutron populations at the two detectors may then be interpreted in terms of the earth formation porosity in accordance with predetermined relationships. Between neutron bursts capture gamma rays are detected in two or more separate time intervals (possibly including a background subtraction time interval, if desired) and these measurements used to derive the thermal neutron capture cross section $\Sigma$ of the formation. These gates may be fixed in time relative to the neutron burst, or may be positioned and have widths related to $\Sigma$. The techniques and apparatus of the present invention give improved results over prior art devices in that less sensitivity to disturbing environmental parameters results from the use of the present invention.

For a better understanding of the present invention, together with other and further objects and features thereof and additional advantages, reference is made to the following detailed description of the invention which is to be taken conjunction with the appended drawings in which:

DESCRIPTION OF THE PREFERRED EMBODIMENT

Figure 1:
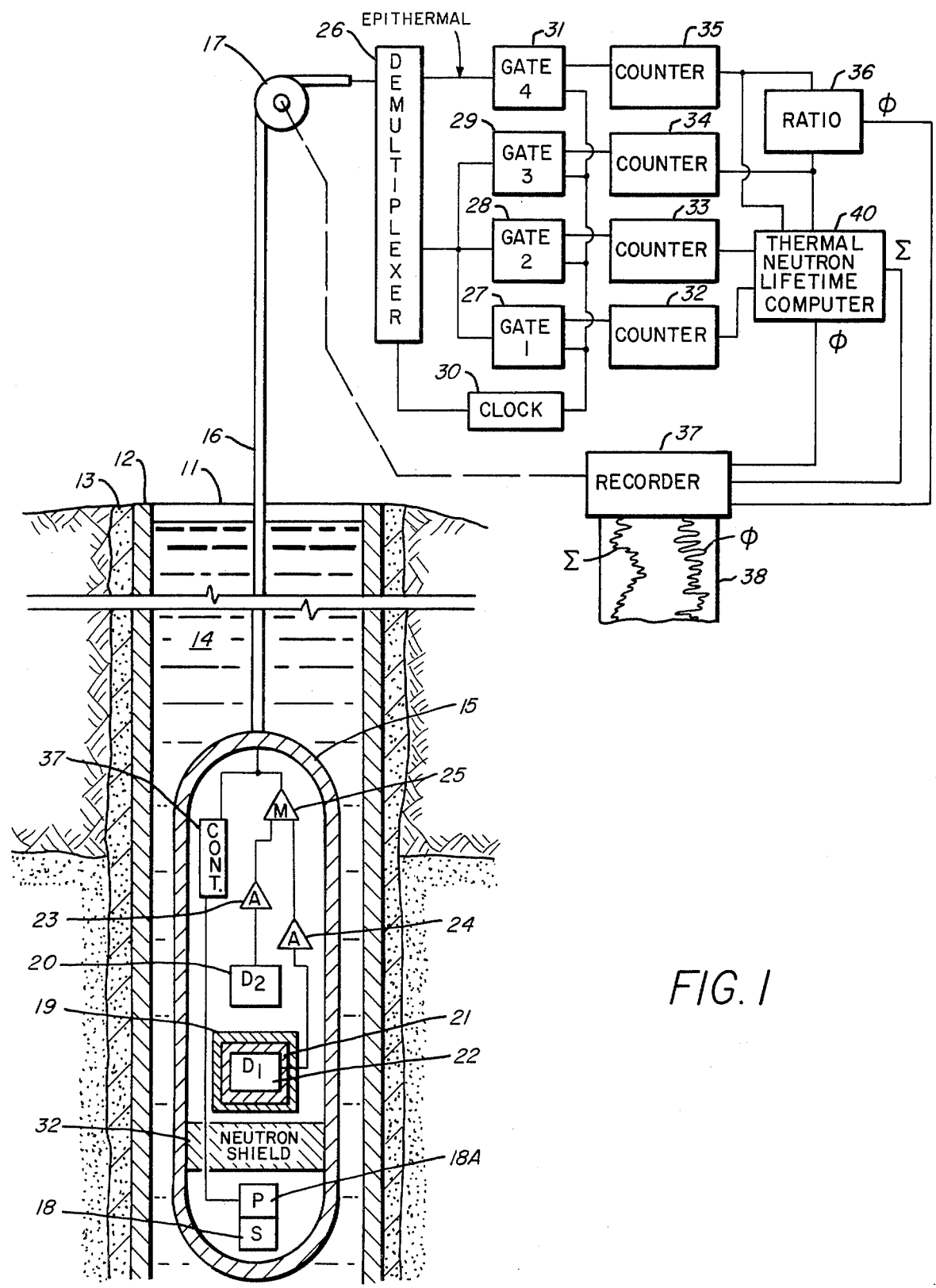
FIG. 1 is a schematic diagram showing a pulsed neutron well logging system according to the principles of the present invention, and having two detectors longitudinally spaced from a pulsed neutron source.

Referring initially to FIG. 1 there may be seen a simplified schematic functional representation in the form of a block diagram of a well logging apparatus in accordance with the present invention. A well borehole 11 pentrating earth formations is lined with a steel casing 12 and is filled with a well fluid 14. The steel casing 12 may be cemented in place by cement layer 13 which also serves to prevent fluid communication between adjacent producing formation in the earth.

The downhole portion of the logging system may be seen to be basically composed of an elongated, fluid tight, hollow, body member or sonde 15 which, during the logging operation, is passed longitudinally through the casing 12 and is sized for passage therethrough. Surface instrumentation, whose function will be discussed in more detail subsequently, is shown for processing and recording electrical measurements provided by the sonde 15. A well logging cable 16 which passes over a sheave wheel 17 supports the sonde 15 in the borehole 11 and also provides a communication path for electrical signals to and from the surface equipment and the sonde 15. The well logging cable 16 may be of conventional armored cable design and may have one or more electrical conductors for transmitting such signals between the sonde 15 and the surface apparatus.

Again, referring to FIG. 1 the sonde 15 contains, at its lower end, a pulsed neutron source 18. This neutron source may comprise a deuterium-tritium accelerator tube which can be operated in pulsed mode to provide repetitive pulses or bursts of essentially monoenergetic 14 MEV neutrons and capable of providing on the order of $10^{+7}$ or more neutrons per second. A pulsing circuit 18A provides electrical pulses which are timed in a manner to be described subsequently to cause the neutron generator 18 to repetitively emit neutron pulses of approximately 50 microseconds durations (it is also possible that the neutron burst width may be related to $\Sigma$).

Radiation detectors 20 and 22 are provided in the downhole sonde 15 and are separated from the neutron source 18 by a neutron shielding material 32. The neutron shield material 32 may comprise any highly hydrogenous material which serves to effectively slow down and shield the detectors 20 and 22 from direct neutron irradiation by the neutron source 18. Any suitably highly hydrogenous material such as paraffin or hydrocarbon polymer plastics suitable for this purpose. A dense material, such as iron or tungsten, may also be suitable. The two detectors 20 and 22 are separated from each other. The spacing of the two detectors 20 and 22 will be discussed in more detail subsequently. An alternative arrangement in which both detectors may be situated at the same distance from the source would be to the place one detector above and one detector below the neutron source 18 at the desired distance.

The detector 20 of FIG. 1 is a combination gamma ray and fast neutron detector. This detector may comprise a scintillation type detector which is sensitive to the interaction of the scintillator material with fast neutrons. Such a detector could comprise, for example, a stilbene detector which is sensitive to fast neutron interactions. Such scintillation detectors are also sensitive to high energy gamma radiation produced by the capture of neutrons from the neutron source in earth formations surrounding the well borehole. However, the pulse shape characteristics of gamma ray interactions produced by such captures may be distinguished from the pulse shape characteristics in such a detector provided by the interaction of a fast neutron with the detector material. Such a stilbene combination gamma ray and fast neutron detector is described in the publication entitled "A SCINTILLATION COUNTER WITH NEUTRON GAMMA RAY DISCRIMINATORS" by F. D. Brooks, Published by the Atomic Energy Research Establishment, Harwell England, 1959, and having laboratory publishing number HL. 59/282 (s.c.9).

The second detector 22 contemplated for use in the present invention is an epithermal neutron detector. This detector which may comprise, for example, a pressurized $He^3$ detector if properly shielded is sensitive to neutrons in the epithermal energy range from approximately 0.178 electron volts to approximately 1.46 electron volts. This is contrasted to the combination gamma ray and fast neutron detector 20 which is essentially sensitive to fast neutrons having energies in the range of from roughly $0.2 \times 10^{+6}$ electrons volts to $12 \times 10^{+6}$ electron volts. Thus, the two detectors 22 and 20 provide two energy bands or windows in which the neutron population energy spectrum may be observed by the downhole well logging sonde 15. The above energy ranges are given only as illustrations. Other fast and epithermal bands, as described in the literature, could also be employed.

The epithermal neutron detector 22 is embedded in a layer of hydrogeneous material 21 and is surrounded by a relatively thin, for example 0.20 inch, layer of thermal neutron absorbing material 19 such as cadmium or the like. The He$^3$ detector 22 is thus shielded from the interaction of thermalized neutrons due to the action of the cadmium layer 19 which, having an extremely large thermal neutron capture cross-section, effectively absorbs all, or most, thermal neutrons in the vicinity of detector 22 before these neutrons can impinge upon the detector and cause any interaction with the detector 22.

The stilbene detector 20 is used to detect the fast neutron population during the neutron burst and is used to detect the thermal neutron population in the interval between bursts as will subsequently be described in more detail. This latter is accomplished due to the fact that the stilbene scintillation is sensitive to capture gamma rays emitted by formation nuclei which capture thermalized neutrons. The pulse shape produced by the detector 20 response to gamma rays is different from the pulse shape produced by its response to fast neutrons as described in the aforementioned paper. Thus, gamma rays passing through the detector may be distinguished from fast neutrons passing through the detector on the basis of this pulse shape characteristic difference. Also as will be described in more detail subsequently, the time gating arrangement used in the system of the present invention differentiates between the fast neutron produced response of detector 20 and the response of the detector 20 to most gamma rays.

In any event, the detectors 20 and 22 provide electrical pulse signals which are representative of the number of neutrons present at their location in the epithermal energy range and in the fast neutron energy range to which the detectors are sensitive during a neutron burst and the capture gamma ray population present at detector 20 in the interval between neutron bursts. The electrical signals from the detector 20 are amplified in an amplifier 23 and supplied to a multiplexing mixing circuit 25. Similarly, the electrical pulse representations from the epithermal detector 22 are conducted to an amplifier 24 and also supplied to the mixer 25. The mixed signals are supplied via cable conductors 16 to a surface demultiplexer circuit 26. This circuit, for example, may discriminate against signals from the two downhole detectors on the basis of their polarity. Output signals from the demultiplexer 26 comprise pulse signals representative of the fast neutron population and gamma ray population in the vicinity of the detector 20 and the epithermal neutron population present in the vicinity of detector 22. The detector 20 pulse signals are supplied to three time gate circuits 27, 28 and 29. The epithermal neutron population signals are supplied to a third time gate 31.

Time gates 27, 28, 29, and 31 are supplied with clocking signals from a clock circuit 30. A control circuit 37 in the downhole tool supplies control signals to the neutron generator pulser circuit 18A each time the neutron generator tube 18 is to emit a pulse of 14 MeV neutrons. This pulse can occur approximately once every 1000 microseconds in the embodiment of the invention illustrated in FIG. 1. It is also possible that the repetition rate is related to $\Sigma$. Simultaneously this neutron generator firing pulse is provided by the control circuit 37 to a conductor of the logging cable 16 for transmission to the surface of the earth. The surface demultiplexer 26 separates these firing pulses out and provides an output pulse corresponding to each one to the clock circuit 30.

In one embodiment clock circuit 30 provides a conditioning pulse immediately upon receipt of the generator fire pulse to time gates 29 and 31, this pulse being of 50 microseconds duration. After a delay of 400 microseconds the clock circuit 30 then provides a conditioning pulse to time gate 27 this gate being of 200 microseconds duration. Then after an additional delay of 300 microseconds (i.e. 700 microseconds after the neutron burst) the clocks 30 supplies a conditioning pulse to time gate 28. This pulse is of 200 microseconds duration also. This timing sequence is illustrated schematically in the timing diagram of FIG. 2.

Figure 2:
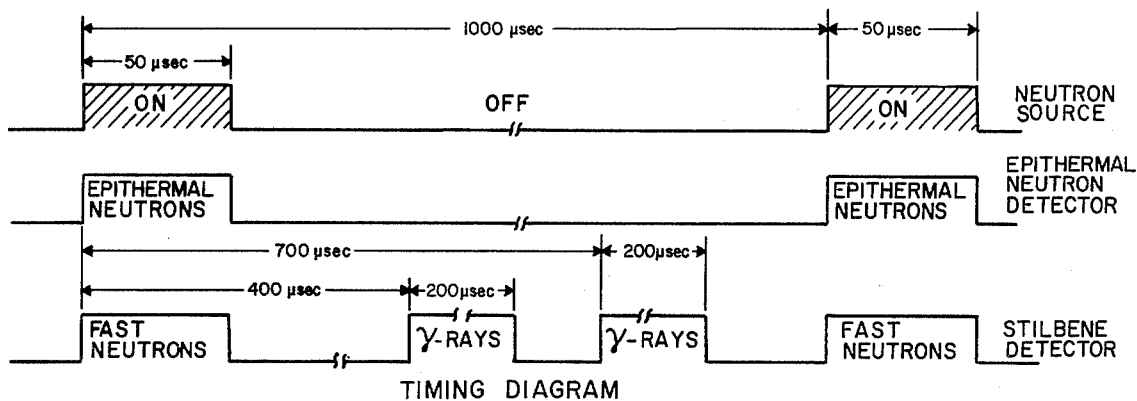
FIG. 2 is one possible timing diagram of the system of FIG. 1.

The effect of the timing sequence of FIG. 2 is for time gates 27 and 28 (labeled Gates 1 and 2) to allow passage of gamma ray population count pulses from downhole stilbene detector 20 to pass to counter circuits 32 and 33 during the two 200 microsecond intervals in the interval between neutron bursts. If desired, a background subtraction gate may also be employed.

Similarly the counts occurring in the epithermal neutron detector 22 and the counts occuring due to fast neutrons in detector 20 in the downhole sonde 15 are permitted to enter counters 34 and 35 via the time gates 29 and 31 (labelled gates 3 and 4) for a 50 microsecond duration interval coinciding with the initiation of a downhole neutron burst.

The counters 34 and 35 thus provide counts of the number of fast neutrons present in the vicinity of detector 20, and epithermal neutrons present in the vicinity of detector 22 in the form of digital counts during each 50 microsecond neutron burst. Counts from fast neutron counter 34 and epithermal neutron counter 35 may be strobed or synchronized at a predetermined rate, for example once per second, into a digital ratio circuit 36. Ratio circuit 36 forms the ratio of counting rates at the two detectors 20 and 22, for example the ratio of fast neutron population present at detector 20 to the epithermal neutron population present at detector 22. It will be appreciated by those skilled in the art that it is possible to weight the ratio to compensate for effects produced by any difference in the distance of the two detectors from the neutron source so that a ratio measurement which is normalized to detectors located at the same distance from the neutron source may be obtained. Similarly, the ratio can be weighted to normalize any differences in detector sensitivities.

It has been discovered by the applicants that this ratio signal is functionally related to the earth formation porosity of the earth formations in the vicinity of the downhole sonde. The output signal from the ratio circuit 36 is supplied to a data recorder 37 which may be of typical strip chart or film recorder type used in well logging. The recorder 37 provides an output trace of the ratio signal on a record medium 38 as a function of borehole depth. The depth information is obtained by mechanically or electrically coupling the recorder 37 to the sheave wheel 17 as indicated by the dotted line 39 of FIG. 1 in a conventional manner as known in the art.

While not shown in FIGS. 1 and 2, it will be appreciated by those skilled in the art that conventional electrical power supplies can be situated, for example, at the surface, to supply operating voltages for the circuit components in the downhole sonde 15 in a manner known in the art.

As previously mentioned the gamma ray counts due to the capture of thermal neutrons are measured at the detector 20 during the two separate time intervals of 200 microseconds duration (labelled Gate 1 and Gate 2) and are accumulated in counters 32 and 33. These counts may be strobed or syncronized at any desired rate, for example once a second, into a small general purpose digital computer 40, labelled thermal neutron lifetime computer. A small computer such as the model PDP-11 supplied by the Digital Equipment Corp. of Maynard, Mass. would be suitable for this purpose.

Figure 4:
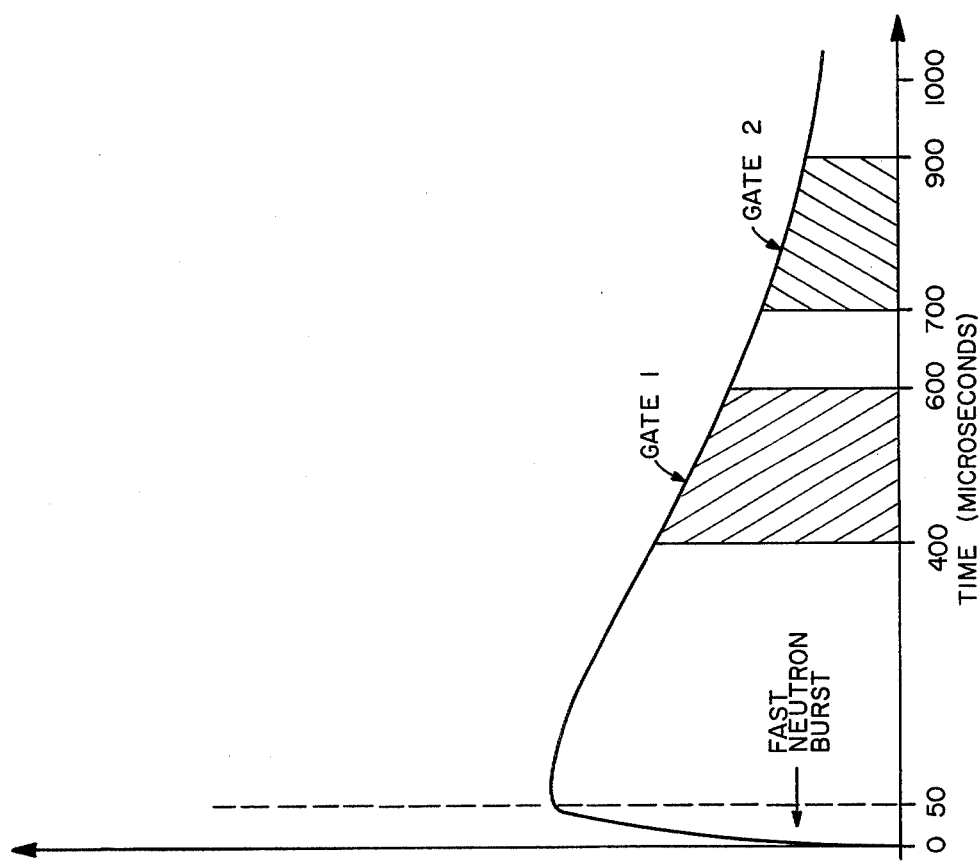
FIG. 4 is a graphical relationship illustrating the thermal neutron population die away after a burst of 14 MeV neutrons.

Referring now to FIG. 4, the population of thermal neutrons in the vicinity of a detector such as stilbene detector 20 is illustrated as a function of time. The two time intervals labelled Gate 1 and Gate 2 are also shown in this figure. The thermal neutron population peaks out just after the completion of a 50 microsecond duration neutron burst due to the slowing down of the neutrons by collision processes with the nuclei of materials in the vicinity of the borehole. The thermal neutron population then declines in an exponential decay due to the capture of the thermal neutrons by the nuclei of the earth formation materials. By sampling the thermal neutron population (i.e. by measuring the amount of thermal neutron capture gamma rays present during the intervals labelled Gate 1 and Gate 2) and by combining these measurements in a manner known in the art, such as that disclosed in U.S. Pat. No. 3,691,378, the thermal neutron capture cross section $\Sigma$ may be derived. These calculations are performed in the computer 40 which may be appropriately programmed for this purpose. Similarly corrections for neutron diffusion to the measured value of capture cross section $\Sigma$ such as those shown in U.S. Pat. No. 3,818,225 may be applied by the computer 40 in this process.

The output signals from the computer 40 which are representative of the cross section $\Sigma$ are displayed or logged as a function of borehole depth by the recorder 37 as previously described with respect to the porosity signal from the ratio computer 36.

Figure 5:
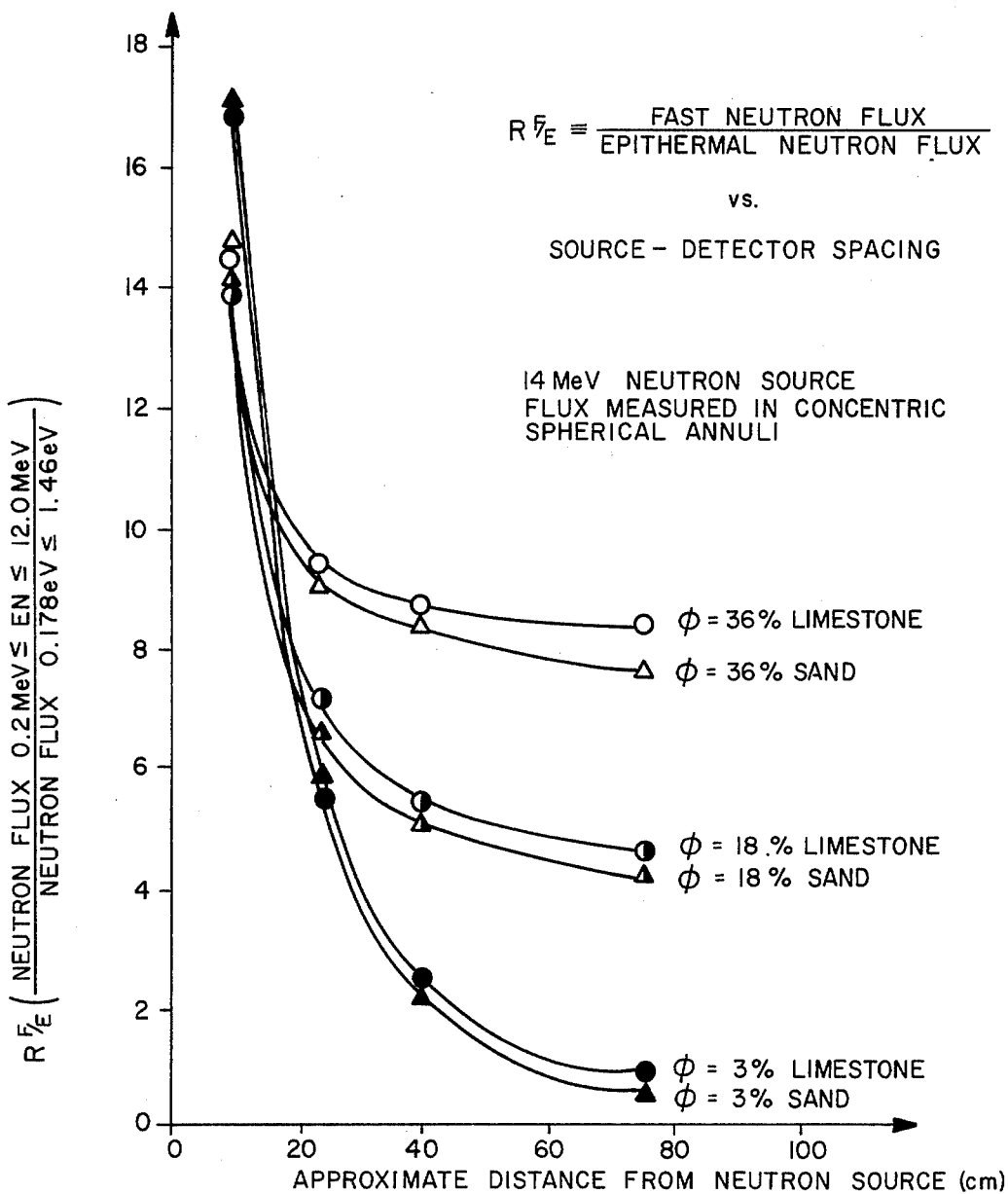
FIG. 5 is a graphical relationship illustrating the calculated fast neutron to epithermal neutron population ratio for several different porosity sandstone and limestone formations as a function of detector distance from a 14 MEV neutron source.
Figure 3:
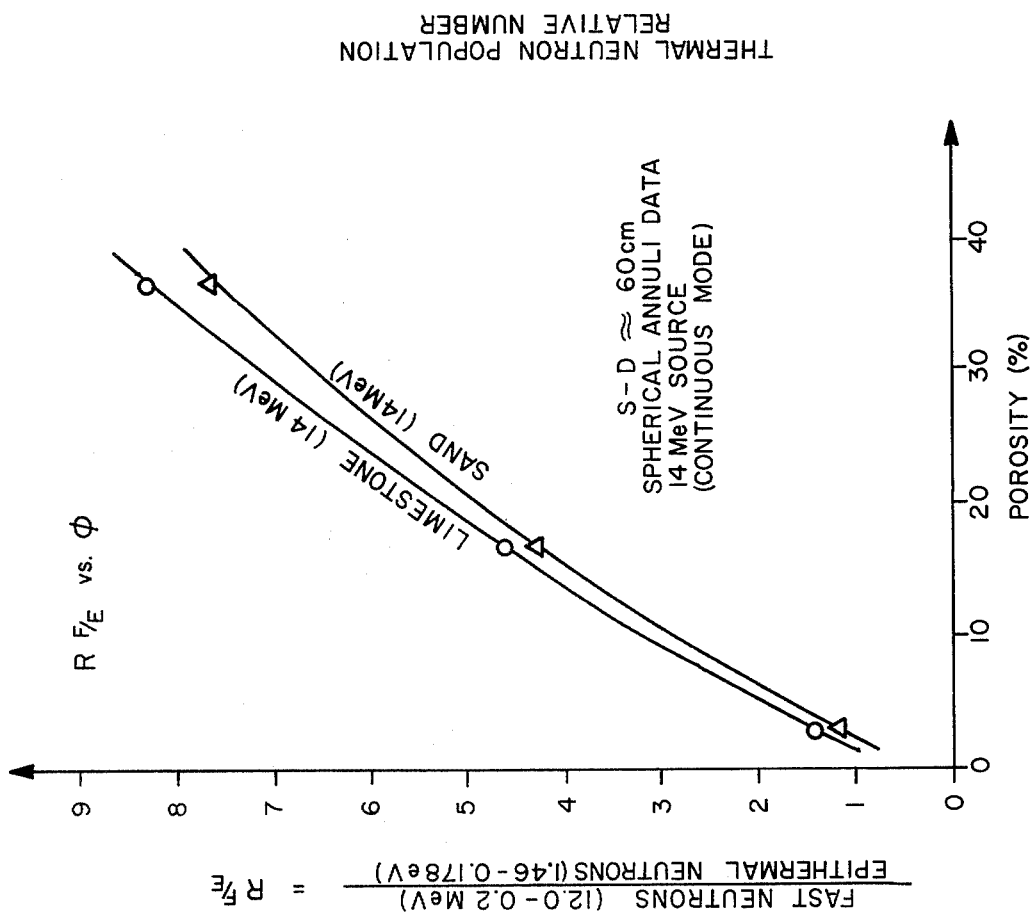
FIG. 3 is a graphical relationship illustrating the variation of the calculated (using Monte Carlo radiation transport theory) neutron flux ratio of a fast neutron detector to an epithermal neutron detector spaced approximately the same distance from a 14 MeV neutron source for sandstone and limestone formations of differing porosities.

Turning now to FIGS. 3 and 5, the basis for the porosity measurement of a well logging system according to the present invention is illustrated. FIG. 3 illustrates graphically the ratio of fast neutron population in the energy range from 0.2 MEV to 12 MEV to epithermal neutron population in the energy range from 0.178 EV to 1.46 EV at source to detector spacings of 60 cm. from a 14 MEV deuterium-tritium neutron accelerator. Values of the ratio are shown for both sandstone and limestone lithologies. It can be observed that no large lithology effect is present in this measurement of porosity and that the ratio varies nearly linearly over the entire porosity range of from 3% to 36%. This represents a dramatic improvement over prior art porosity measurements made with 14 MEV neutron sources and detectors spaced at shorter distances than the 60 cm. of the system shown in FIG. 3. Such prior art measurements suffered from non-linear response and lack of sensitivity of porosity changes high porosity range from 18% to 36% and also from lithology effects due to the measurement of thermal neutron capture reactions.

FIG. 5 illustrates the fast neutron to epithermal neutron population ratio over the same energy ranges as FIG. 3, but plotted as a function of source to detector spacing from a 14 MEV deuterium-tritium accelerator source. The sandstone and limestone lithology response for porosities in the range of from 3% to 36% is shown in FIG. 5 also. It can be observed from FIG. 5 that greater sensitivity of a system according to the present invention can be achieved with source to detector spacings in the range greater than about 30 cm. Such spacings are preferred for logging systems according to the present invention.

The present invention, by measuring only neutrons in the fast and epithermal energy range remains less sensitive to formation lithology effects than other logs which measure porosity by measurements of the neutron population in the thermal energy range. Small concentrations of boron or other strong thermal neutron absorbers do not adversely effect the measurement of the present invention.

It is possible, by placing calibration charts such as that of FIGS. 3 and 5 in the memory of a small general purpose digital computer, to compute and record the porosity of earth formations directly as a function of depth, utilizing a well logging system in accordance with the concepts of the present invention and as illustrated in FIG. 1. The calibration chart such as FIG. 3 could be, for example, entered in the memory of a computer in a tabular form. The neutron population measurements can be taken from the borehole instrument and supplied as input to a small computer such as the aforementioned computer 40. This alternative arrangement is also shown in FIG. 1. It would also be apparent given the disclosure of the invention present herein, for a programmer of ordinary skill to program such a small general purpose digital computer using a common compiler language such as FORTRAN and utilizing conventional mathematical interpolation procedures to perform this porosity calculation from the calibration charts in the manner described.

The foregoing descriptions may make other alternative arrangements of the concepts of the present invention, apparent to those skilled in the art. It is therefore, the aim of the appended claims to cover all such changes and modifications as may be made within the true spirit and scope of the invention.

We claim:
1. A method for simultaneously determining the porosity and thermal neutron capture cross section of earth formations in the vicinity of a well borehole, comprising the steps of:
   passing a well tool sized and adapted for passage therethrough into a cased well borehole, said tool having a pulsed source of fast neutrons therein and a combination fast neutron and gamma ray detector and an epithermal neutron detector;
   repetitively irradiating the earth formations in the vicinity of the borehole with bursts of fast neutrons;
   detecting at least at one spaced distance from said neutron source and for a first time duration interval extant essentially only during said neutron bursts the fast neutron and epithermal neutron populations in the borehole and generating first and second measurement signals representative thereof;
   detecting at least at one spaced distance from said neutron source and for second and third duration time intervals extant essentially only during the time between said neutron bursts, the gamma radiation present in the borehole due to the capture of thermalized neutrons by the nuclei of elements comprising the earth formations and generating third and fourth measurement signals representative thereof; and combining said first and second measurement signals according to a predetermined relationship to derive an indication of the porosity of the earth formations and combining said third and forth measurement signals to derive an indication of the thermal neutron capture cross section of the earth formations.

2. The method of claim 1 wherein the steps are repeated at different depths in the borehole and the output signals are recorded as a function of borehole depth.

3. The method of claim 1 wherein the neutron bursts are of approximately 50 microseconds duration and are repeated approximately 1000 times per second.

4. The method of claim 3 wherein said second and third duration time intervals are approximately of equal duration and are spaced apart in time by a fourth duration time interval.

5. The method of claim 3 wherein said second and third duration time intervals are adjusted relative to the measured thermal neutron capture cross section to a duration inversely related to the cross section.

6. The method of claim 1 wherein the irradiating step is performed with a pulsed deuterium-tritium reaction accelerator tube which emits essentially monoenergetic 14 MEV neutrons.

7. The method of claim 1 wherein the detecting steps are performed using a combination fast neutron and gamma ray detector comprising a stilbene detector.

8. The method of claim 7 wherein said combination fast neutron and gamma ray detector is located at least 30 cm. from said neutron source.

9. The method of claim 7 wherein said combination fast neutron and gamma ray detector is located at least 30 cm. but less than 80 cm. from said neutron source.

10. The method of claim 1 wherein said detecting steps are performed by using a cadmium wrapped sodium iodide detector for detecting the epithermal neutron population.

* * * * *